(12) United States Patent
Otani et al.

(10) Patent No.: US 8,746,718 B2
(45) Date of Patent: Jun. 10, 2014

(54) SUSPENSION MOUNTING STRUCTURE FOR VEHICLE

(75) Inventors: Takahiro Otani, Hiroshima (JP); Masanobu Fukushima, Higashihiroshima (JP); Hiroaki Takeshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/807,643

(22) PCT Filed: Jun. 21, 2011

(86) PCT No.: PCT/JP2011/003523
§ 371 (c)(1),
(2), (4) Date: Dec. 28, 2012

(87) PCT Pub. No.: WO2012/001909
PCT Pub. Date: Jan. 5, 2012

(65) Prior Publication Data
US 2013/0099461 A1    Apr. 25, 2013

(30) Foreign Application Priority Data
Jun. 30, 2010 (JP) .................................. 2010-149578

(51) Int. Cl.
*B62D 21/11* (2006.01)
*B60G 7/02* (2006.01)

(52) U.S. Cl.
CPC *B62D 21/11* (2013.01); *B60G 7/02* (2013.01); *B60G 2204/15* (2013.01); *B60G 2206/60* (2013.01)
USPC ............. 280/124.109; 280/124.134; 280/781; 280/788; 296/193.09

(58) Field of Classification Search
USPC .................. 280/124.109, 781, 124.134, 788; 180/311; 296/203.01–203.03, 204, 296/193.07, 193.09
See application file for complete search history.

(56) References Cited

U.S. PATENT DOCUMENTS

| 4,720,120 A | * | 1/1988 | Shimatani et al. ..... 280/124.109 |
| 5,611,569 A | * | 3/1997 | Sekiguchi et al. ............ 280/788 |

(Continued)

FOREIGN PATENT DOCUMENTS

| EP | 1266773 A2 | 12/2002 |
| EP | 1982856 A1 | 10/2008 |

(Continued)

OTHER PUBLICATIONS

Otani et al., Vehicle Front Body Structure, Feb. 25, 2010, JPO, JP 2010-042742 A, Machine Translation of Description.*

(Continued)

*Primary Examiner* — James English
(74) *Attorney, Agent, or Firm* — Studebaker & Brackett PC

(57) ABSTRACT

An object of the present invention is to effectively ensure the rigidity of supporting a front suspension with a simple configuration, without increasing the weight of a vehicle body. In a suspension mounting structure for a vehicle in which a front suspension is supported by sub frames 3, the sub frames 3 have a pair of right and left side sub frames 9 that extend in a front-rear direction of a vehicle in lower parts of front side frames 2; and a rear sub cross member 11 that couples rear end parts of the right and left side frames 9 to each other. Rear parts of the sub frames 9 are provided with: lower arm supporting parts for swingably and elastically displaceably supporting lower arms 41 of the front suspension; first fixing parts 31 that rigidly bond a rear end part of the rear sub cross member 11 to a bottom surface of a vehicle body; and second fixing parts 40 that rigidly bond side end parts of the rear sub cross member 11 to the bottom surface of the vehicle body at positions that are offset outward from the first fixing parts 31 in a vehicle width direction.

12 Claims, 10 Drawing Sheets

(56) References Cited

U.S. PATENT DOCUMENTS

| | | | |
|---|---|---|---|
| 7,097,185 B2* | 8/2006 | Kato et al. | 280/124.109 |
| 7,213,873 B2* | 5/2007 | Murata et al. | 296/204 |
| 7,360,621 B2* | 4/2008 | Komiya | 180/312 |
| 7,559,402 B2* | 7/2009 | Jennings et al. | 180/312 |
| 7,681,943 B2* | 3/2010 | Murata et al. | 296/203.02 |
| 8,246,061 B2* | 8/2012 | Kang | 280/124.109 |
| 8,267,429 B2* | 9/2012 | Takeshita et al. | 280/784 |
| 8,480,102 B2* | 7/2013 | Yamada et al. | 280/124.109 |
| 8,490,988 B2* | 7/2013 | Takeshita et al. | 280/124.109 |
| 2005/0212334 A1 | 9/2005 | Murata et al. | |
| 2007/0278778 A1* | 12/2007 | Tanaka et al. | 280/788 |
| 2009/0058134 A1* | 3/2009 | Hiraishi et al. | 296/187.09 |
| 2009/0096253 A1* | 4/2009 | Yatsuda | 296/193.09 |
| 2011/0095568 A1* | 4/2011 | Terada et al. | 296/187.09 |
| 2012/0187724 A1* | 7/2012 | Tomozawa et al. | 296/193.09 |

FOREIGN PATENT DOCUMENTS

| | | |
|---|---|---|
| JP | 2002-370670 A | 12/2002 |
| JP | 2003-182629 A | 7/2003 |
| JP | 2005-271810 A | 10/2005 |
| JP | 2006-281953 A | 10/2006 |
| JP | 2010-042742 A | 2/2010 |

OTHER PUBLICATIONS

International Search Report; PCT/JP2011/003523; Sep. 20, 2011.

* cited by examiner

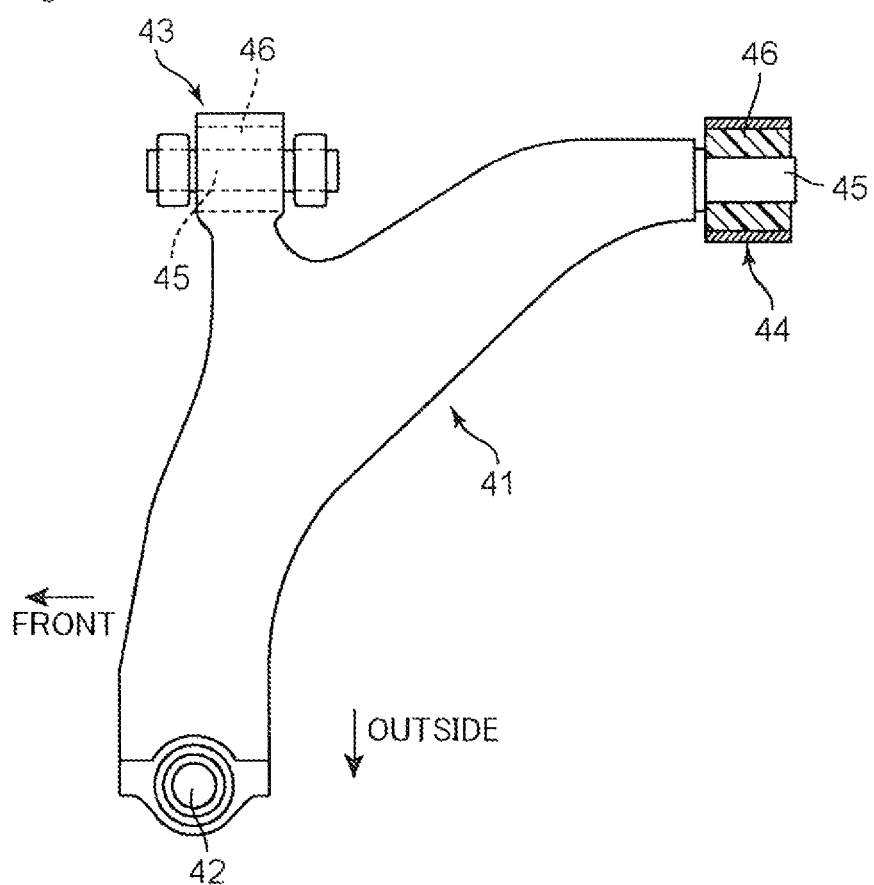

SUSPENSION MOUNTING STRUCTURE FOR VEHICLE

TECHNICAL FIELD

The present invention relates to a suspension mounting structure for a vehicle, which has a pair of right and left front side frames that extend from a dash panel installed in a front surface part of a vehicle interior toward the front side of a vehicle, and sub frames provided below the front side frames, to support a front suspension on the sub frames.

BACKGROUND ART

Patent Document 1 below discloses a conventional vehicle body structure in which side sub frames (side frames) are provided below a pair of right and left front side frames (vehicle body frames) extending in a front-rear direction of a vehicle, and the side sub frames are supported elastically displaceably on the front side frames via supporting parts having rubber bushes. This vehicle body structure is provided with a pair of right and left impact absorbing members extending forward beyond front end parts of the side sub frames, and a reinforcement that extends in a vehicle width direction so as to provide a bridge between the right and left impact absorbing members. In addition, bending parts that can be bent downward in response to a load applied in the front-rear direction of the vehicle are provided in the side sub frames.

CITATION LIST

Patent Literature

[PTL 1]
Japanese Patent Application Laid-open No. 2005-271810

SUMMARY OF INVENTION

As described in Patent Document 1 above, when rubber bushes are disposed in the supporting parts that cause the front side frames to support the side sub frames of sub frames that support a front suspension, the rubber bushes of the supporting parts can absorb road noise that is input from the wheels to the front suspension when the vehicle runs. Therefore, the road noise is effectively prevented from being transmitted from the front side frames to the vehicle interior. However, the front side frames cannot be utilized proactively as supporting members for supporting loads that are input from the tires to the front suspension when the vehicle turns. In this case, sufficient strength of the sub frames needs to be ensured in order to apply the loads stably, which inevitably leads to an increase in the weight of the vehicle body.

The present invention was contrived in view of the points described above, and an object thereof is to provide a suspension mounting structure for a vehicle, which is capable of effectively ensuring the rigidity of supporting a front suspension by using a simple configuration without increasing the weight of a vehicle body.

In order to accomplish the object described above, the invention of the present application is a suspension mounting structure for a vehicle, which has a pair of right and left front side frames that extend from a dash panel installed in a front surface part of a vehicle interior toward a front side of the vehicle, and sub frames provided below the front side frames, to support a front suspension on the sub frames, wherein the sub frames have a pair of right and left side sub frames that extend in a front-rear direction of the vehicle in lower parts of the front side frames, and a rear sub cross member that is provided in an extended manner in a vehicle width direction so as to couple rear end parts of the right and left side frames to each other, and rear parts of the sub frames are provided with a pair of right and left lower arm supporting parts for swingably and elastically displaceably supporting lower arms of the front suspension, a pair of right and left first fixing parts that rigidly bond a rear end part of the rear sub cross member to a bottom surface of a vehicle body, and a pair of right and left second fixing parts that rigidly bond side end parts of the rear sub cross member to the bottom surface of the vehicle body at positions that are offset outward from the first fixing parts in the vehicle width direction.

In the present invention according to the configuration described above, the rear parts of the sub frames are provided with the pair of right and left lower arm supporting parts for swingably and elastically displaceably supporting the lower arms of the front suspension, the pair of right and left first fixing parts that rigidly bond the rear end part of the rear sub cross member to the bottom surface of the vehicle body, and the pair of right and left second fixing parts that rigidly bond the side end parts of the rear sub cross member to the bottom surface of the vehicle body at the positions that are offset outward from the first fixing parts in the vehicle width direction. Therefore, thrust loads that are input from the lower arms of the front suspension to the rear parts of the sub frames can be effectively supported by both the sub frames and the bottom surface of the vehicle body.

Thus, unlike a conventional device in which a rubber bush is disposed in a supporting part that supports a side end part of a sub frame supporting the front suspension in order to absorb road noise that is input from a wheel to the front suspension when the vehicle runs, the suspension mounting structure of the present invention is advantageous in simplifying the structure of each sub frame to attain a light vehicle body and adequately ensuring the rigidity of supporting the loads that are input from the tires to the front suspension when the vehicle turns. In addition, since the lower arm supporting parts provided in the rear parts of the sub frames swingably and elastically displaceably support the lower arms of the front suspension, road noise that is input to the lower arms can be absorbed by the lower arm supporting parts and effectively prevented from being transmitted to the sub frames and the front side frames supporting the sub frames. As a result, a sufficiently quiet vehicle interior can be ensured.

BRIEF DESCRIPTION OF DRAWINGS

FIG. 11 is a plan view showing a specific structure of a lower arm.

DESCRIPTION OF EMBODIMENTS

FIGS. 1 to 4 each show an embodiment of a suspension mounting structure for a vehicle according to the present invention. The suspension mounting structure for a vehicle has a pair of right and left front side frames 2 that extend from a dash panel 1 installed in a front surface part of a vehicle interior toward the front side of the vehicle, and sub frames 3 provided below the front side frames 2. A front suspension 4 is supported on the sub frames 3.

Figure 1:
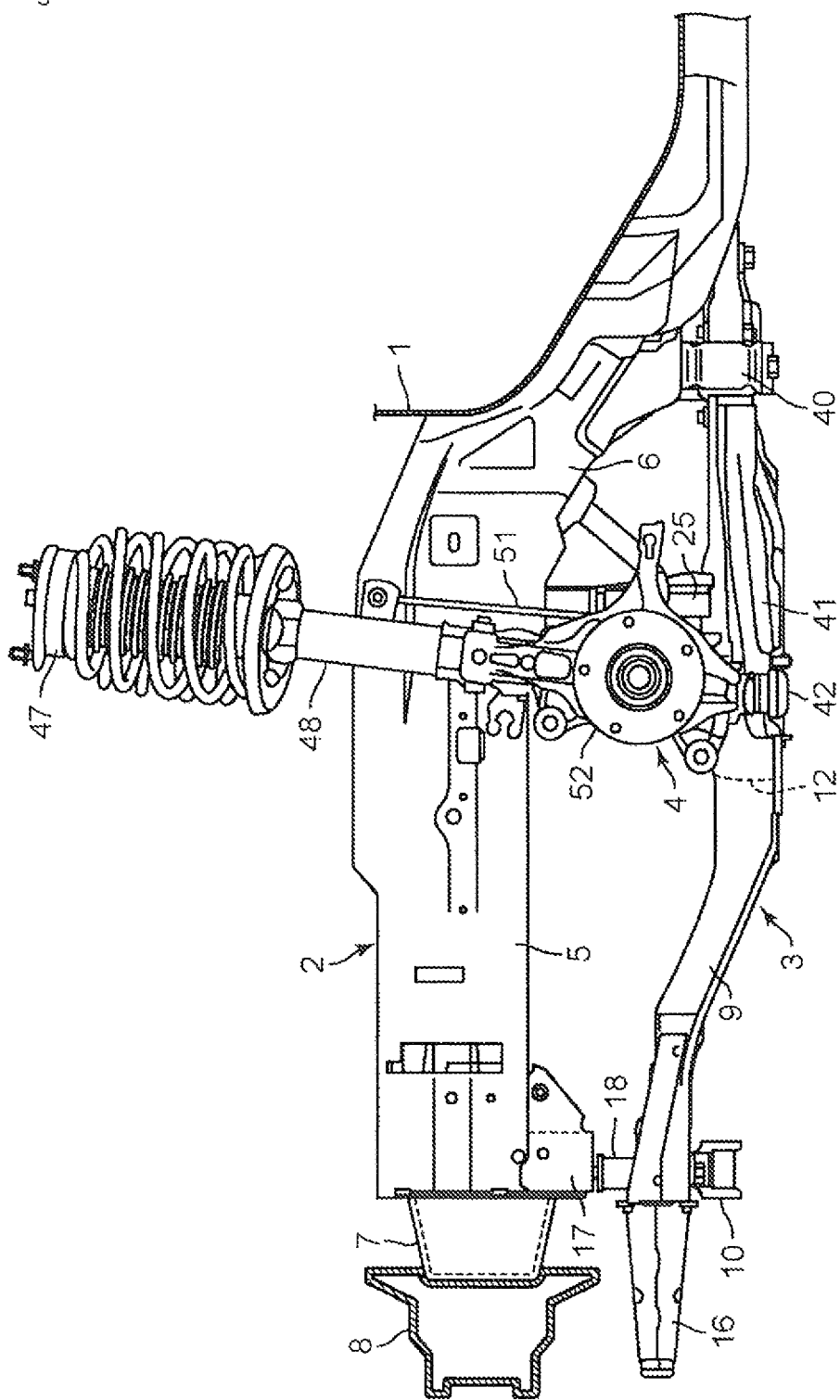
FIG. 1 is a side view showing an embodiment of a suspension mounting structure for a vehicle according to the present invention.

Each of the front side frames 2 is configured to have a closed cross-sectional shape with an inner panel 2a located in an inner side in a vehicle width direction and an outer panel 2b located on an outside side in the vehicle width direction (see FIG. 4), and has a horizontal part 5 extending substantially horizontally as viewed from the side, and a kick up part 6 that extends rearward from a rear end part of the horizontal part 5 while inclining downward (with a front side up) along a lower end part of the dash panel 1 (see FIG. 1). Front end parts of the front side frames 2 are provided with a pair of right and left upper impact absorbing members (crash cans) 7, made of metallic cylinders, that project toward the front side. A bumper reinforcement 8 is installed on a front end surface of each upper impact absorbing member 7 so as to extend in the vehicle width direction.

Figure 3:
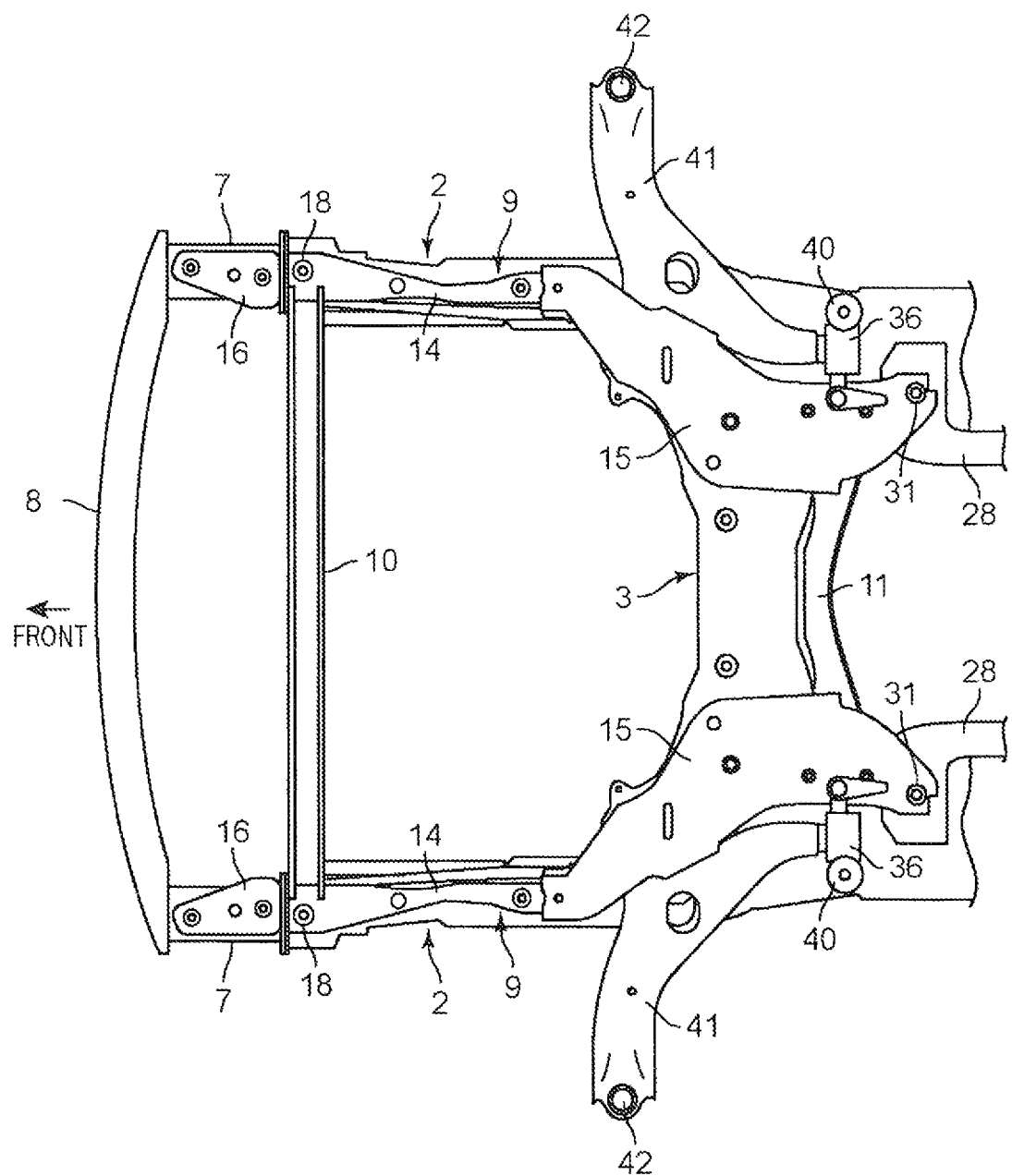
FIG. 3 is a bottom view showing the embodiment of the suspension mounting structure.
Figure 5:
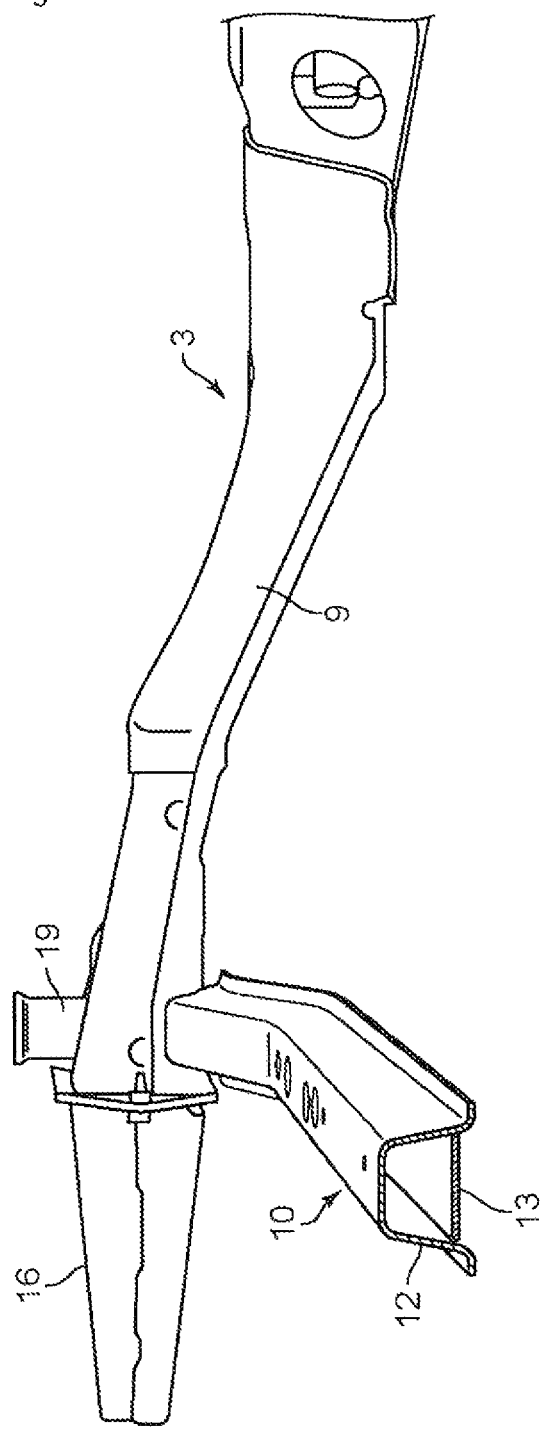
FIG. 5 is an explanatory diagram showing a specific structure of a front sub cross member.

Each of the sub frame 3 is configured by a so-called perimeter frame that is formed into a hollow by joining an upper panel and a lower panel to each other. As shown in FIG. 3, the sub frames 3 have a pair of right and left side sub frames 9 that extend in the front-rear direction of the vehicle in lower parts of the front side frames 2, a front sub cross member 10 that is provided in an extended manner in the vehicle width direction so as to couple front end parts of the left and right side sub frames 9 to each other, and a rear sub cross member 11 that is provided in an extended manner in the vehicle width direction so as to couple rear end parts of the right and left side sub frames 9 to each other. As shown in FIG. 5, the front sub cross member 10 is formed to have a closed cross section with a cross member main body 12 having a hat-shaped cross section and a bottom surface plate 13 covering a lower part of the cross member main body 12.

The side sub frames 9 are configured by front side parts 14 that are narrower than the front side frames 2 in a planar view, and rear side parts 15 that are wider than the front side frames 2 (see FIG. 3). The front end parts of the side sub frames 9 are provided with a pair of right and left lower impact absorbing members (crash can) 16, made of metallic cylinders, that project forward, and front end fixing parts 18 that are rigidly bonded to an attachment part 17 without rubber bushes therebetween, the attachment part 17 being provided on a lower surface of each of the front side frames 2.

Figure 6:
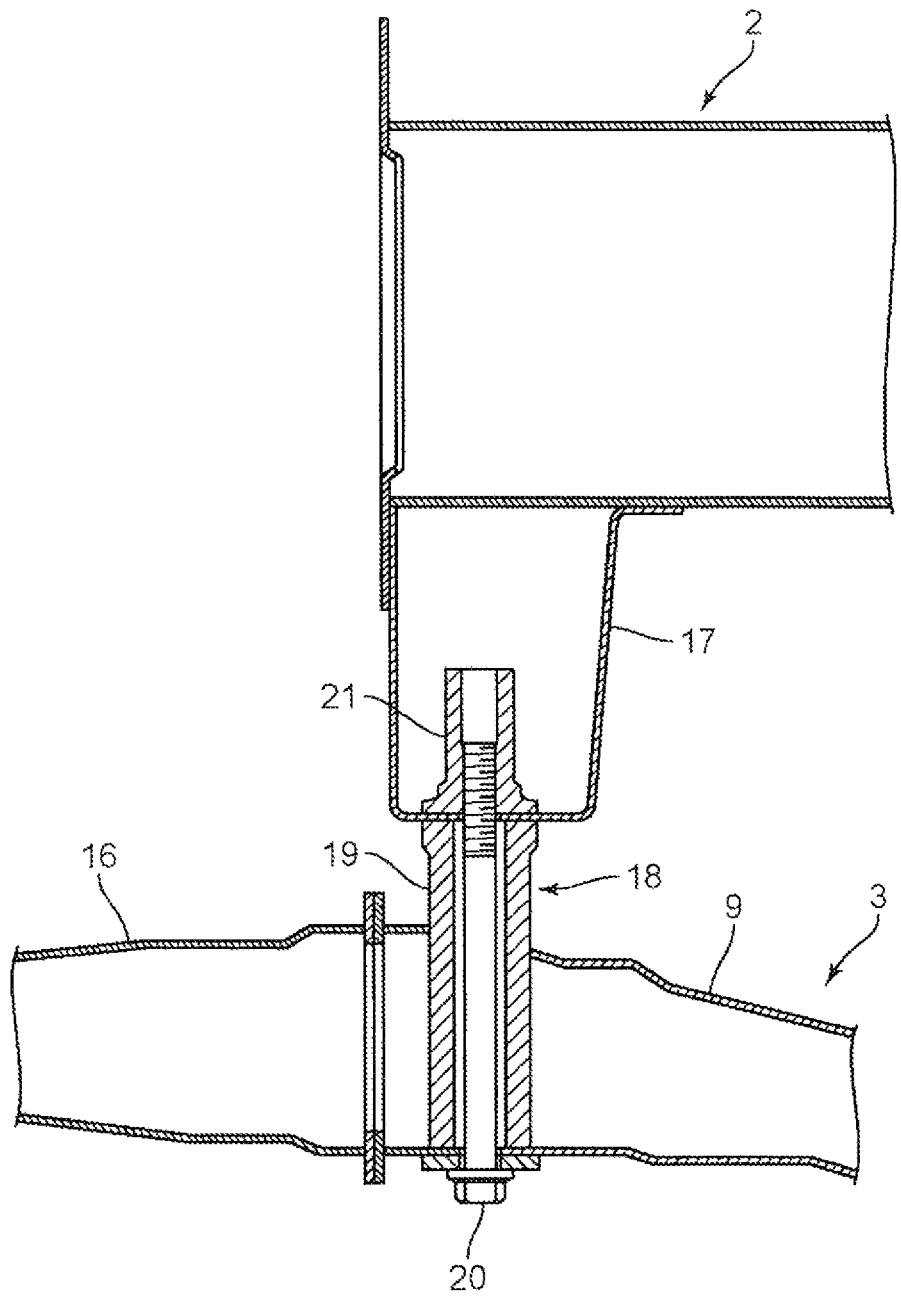
FIG. 6 is a side cross-sectional diagram showing a specific structure of a front end fixing part.

As shown in FIG. 6, each of the front end fixing parts 18 is installed with a coupling pipe 19 that pierces vertically through each of the front end parts of the side sub frames 9 and has an upper end part projecting upward, and a tightening bolt 20 that is inserted into a through-hole of the coupling pipe 19 from below. Tightening force, which is applied by screwing a screw shaft of the tightening bolt 20 to a nut member 21 provided in the attachment part 17 of each front side frame 2, strongly brings an upper end surface of the coupling pipe 19 into press-contact with a lower surface of the attachment part 17. The upper end surface of the coupling pipe 19 and the lower surface of the attachment part 17 are rigidly bonded to each other in a state in which relative displacement (elastic displacement) of the front end part of each side sub frame 9 and the front end part of each front side frame 2 is regulated.

Figure 4:
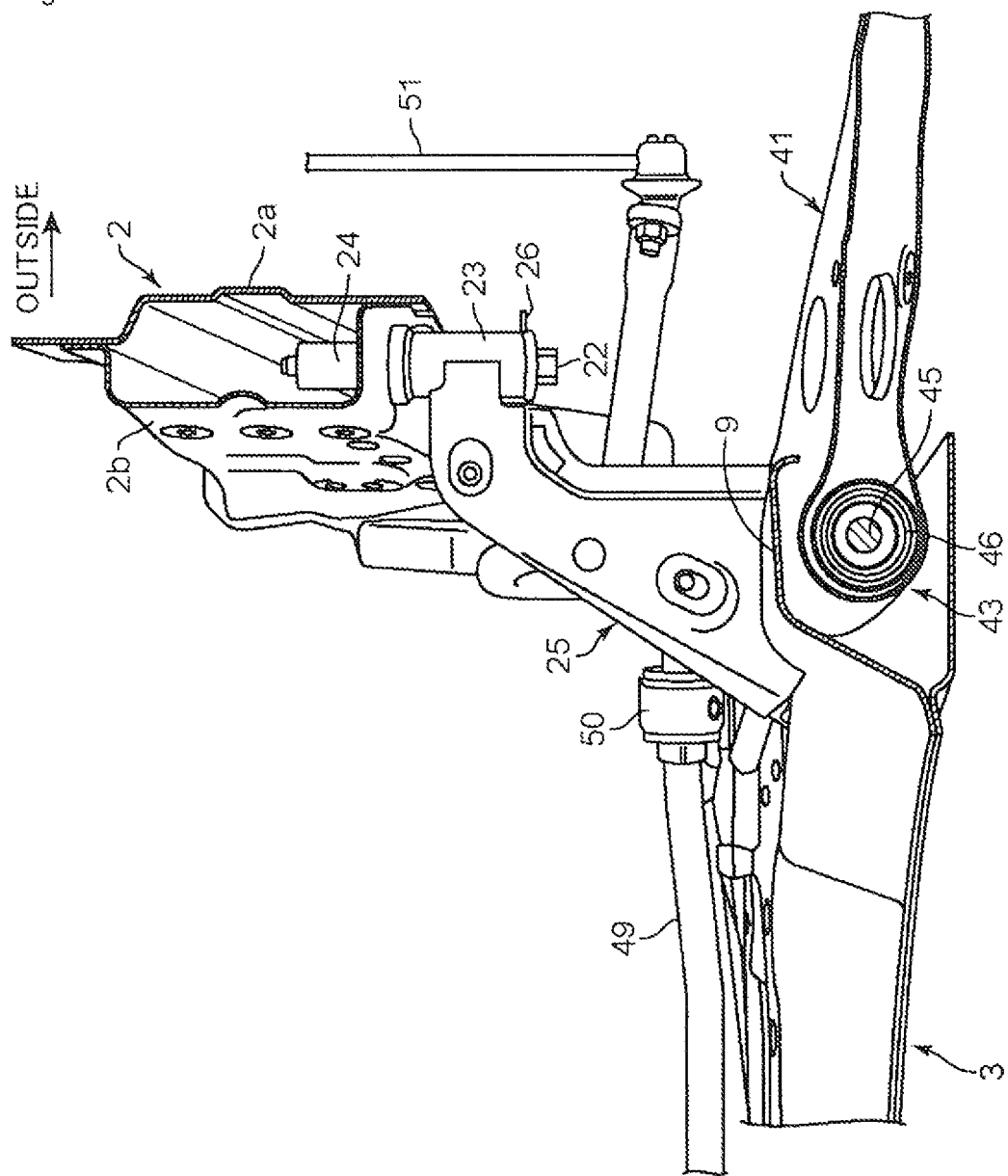
FIG. 4 is a cross-sectional diagram taken along line IV-IV shown in FIG. 2.
Figure 7:
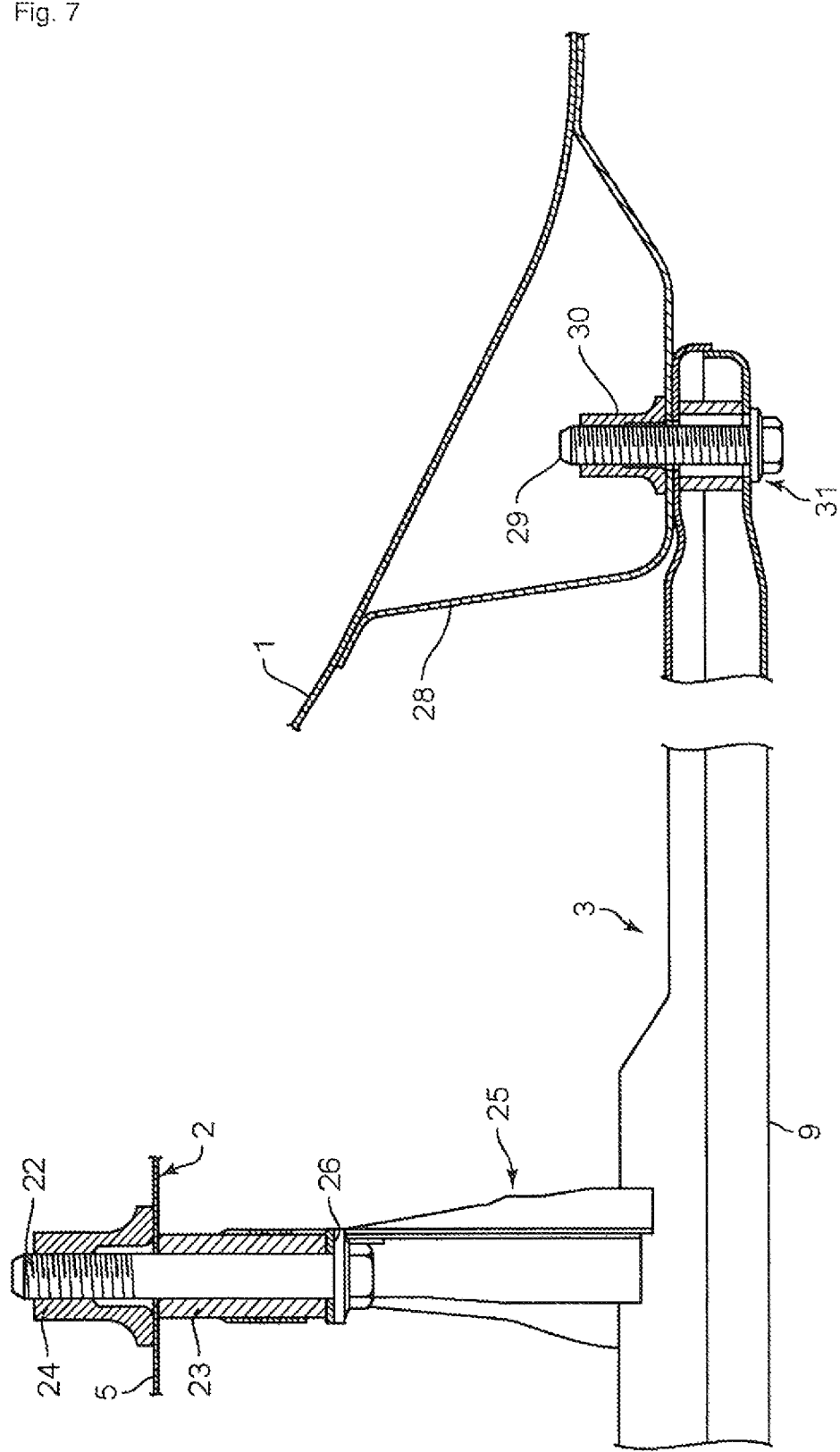
FIG. 7 is a side cross-sectional diagram showing specific structures of an intermediate fixing part and first fixing part.

As shown in FIGS. 4 and 7, a front-rear direction intermediate part of each side sub frame 9 is provided with an intermediate fixing part 25 that is rigidly bonded to a lower surface of the rear end part of the horizontal part 5 of the front side frame 2 by a tightening bolt 22, a coupling pipe 23 and a nut member 24. The intermediate fixing part 25 is made of a leg member protruding upward from an upper surface of the side sub frame 9. The coupling pipe 23 is fixedly attached to an outside surface of an upper end part of the intermediate fixing part 25 by means of welding. In FIG. 7 and the like, reference numeral 26 represents a washer plate that is installed to support a lower end part of the coupling pipe 23 and come into abutment with a top part of the tightening bolt 22.

A screw shaft of the tightening bolt 22, which is installed by allowing the coupling pipe 23 and a through hole of the washer plate 26 to pass through the tightening bolt 22 from therebelow, is screwed into the nut member 24 installed in the horizontal part 5 of the front side frame 2. Tightening force of the tightening bolt 22 strongly brings an upper end surface of the coupling pipe 23 into press-contact with a lower surface of the rear end part of the horizontal part 5 of the front side frame 2. As a result, the upper end surface of the coupling pipe 23 and the lower surface of the rear end part of the horizontal part 5 of the front side frame 2 are rigidly bonded to each other in a state in which relative displacement of the front-rear direction intermediate part of the side sub frame 9 and the rear end part of the horizontal part 5 of the front side frame 2 is regulated.

Figure 8:
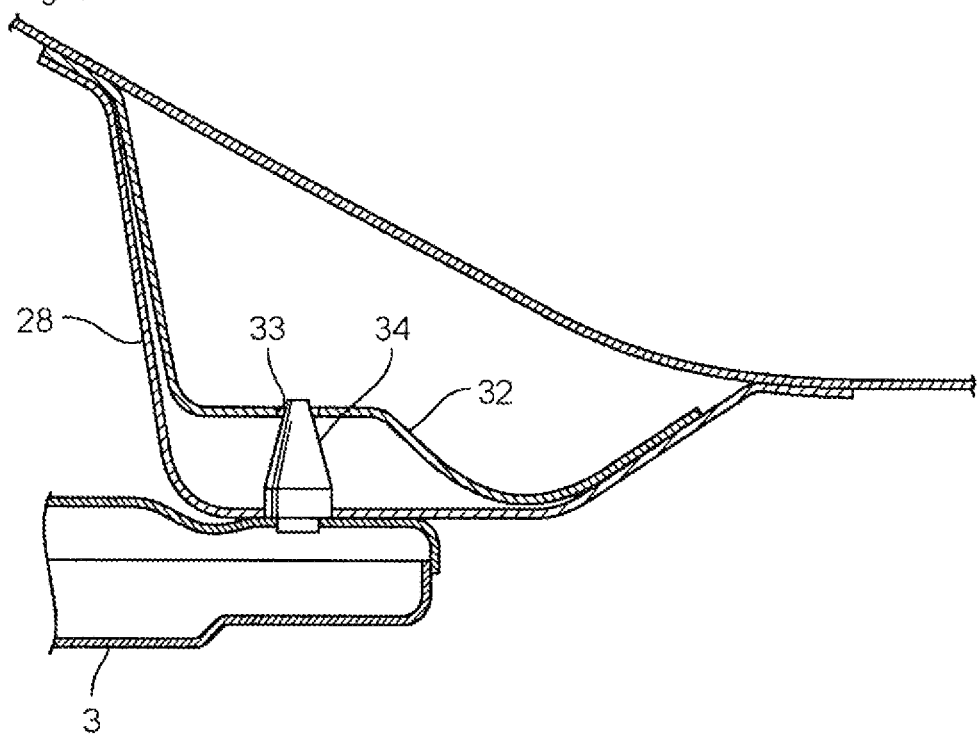
FIG. 8 is a side cross-sectional diagram showing a structure of a position part of a sub frame.
Figure 9:
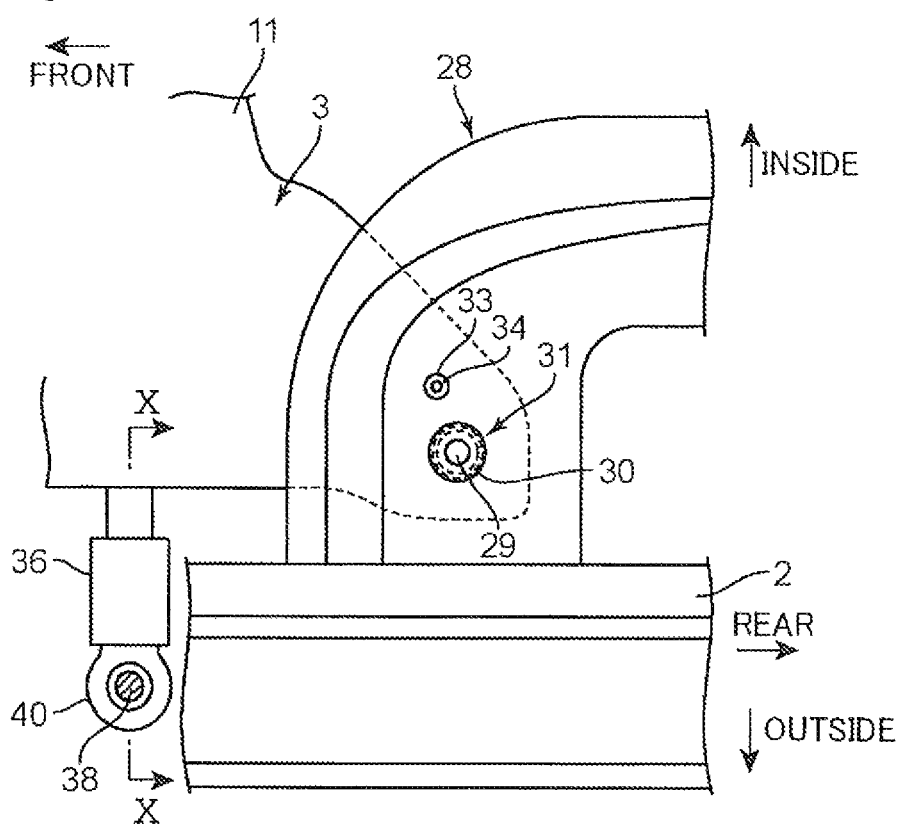
FIG. 9 is a plan view showing specific structures of first and second fixing parts.

As shown in FIGS. 7 to 9, a rear end part of each sub frame 3 is provided with a first fixing part 31 that rigidly bonds a rear end part of the rear sub cross member 11 to a lower surface of the vehicle body by a tightening bolt 29 and nut member 30, the lower surface of the vehicle body being configured by a lower surface of a tunnel frame 28 disposed below the dash panel 1. The nut member 30 is installed in a front end part of the tunnel frame 28, and a positioning hole 33 is formed on a side of the nut member 30. The first fixing part 31 is provided on either side to form a pair, as shown in FIG. 3.

While an upper end part of a reference pin 34 protruding on an upper surface of the rear end part of the rear sub cross member 11 is inserted into the positioning hole 33 to position the rear end part of the rear sub cross member 11, the tightening bolt 29 is installed by allowing a bolt hole on the rear end part of the rear sub cross member 11 and a spacer 35 disposed thereabove to pass through the tightening bolt 29 from therebelow. The screw shaft of the tightening bolt 29 is then screwed to the nut member 30. Tightening force of the tightening bolt 29 brings the upper surface of the rear end part of the rear sub cross member 11 into press-contact with the lower surface of the tunnel frame 28. Accordingly, the rear end part of the rear sub cross member 11 is rigidly bonded to the lower surface of the vehicle body configured by the lower surface of the tunnel frame 28.

Figure 10:
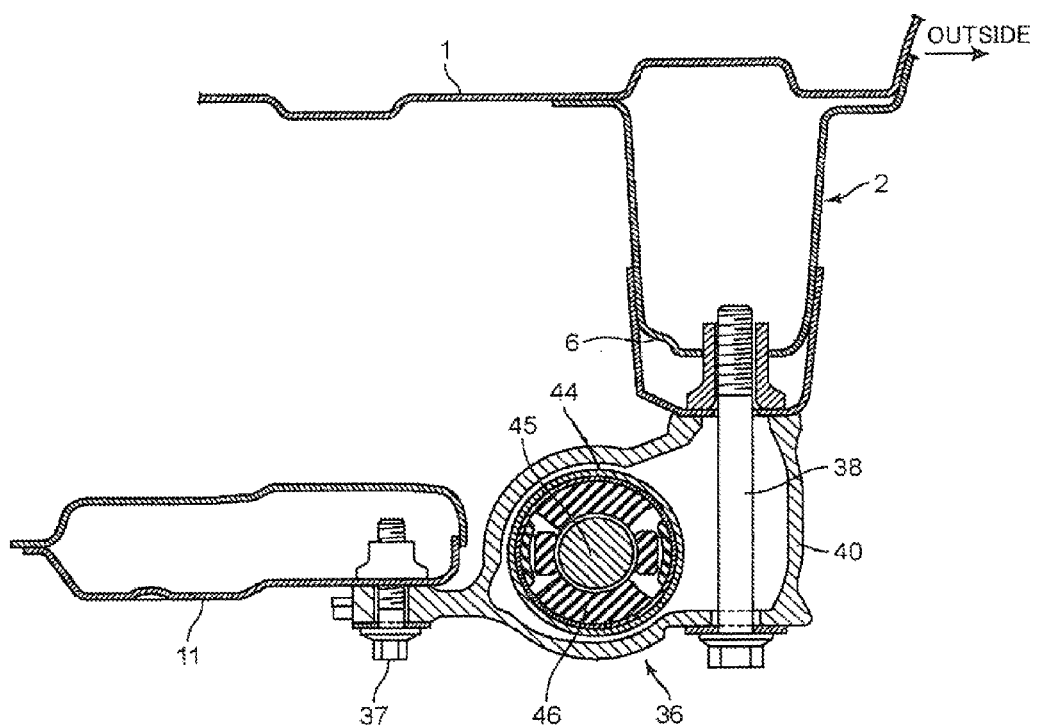
FIG. 10 is a cross-sectional diagram taken along line X-X shown in FIG. 9.

As shown in FIGS. 9 and 10, a front side of each first fixing part 31 is installed with a projecting member 36 that projects outward in the vehicle width direction from a position corresponding to the rear end part of the rear sub cross member 11. A base end part of the projecting member 36 is fixed to a lower surface of each side end part of the rear sub cross member 11 by a fixing bolt 37. At a tip end part of the projecting member 36 (an outer end part in the vehicle width direction), a position that is offset outward from the first fixing part 31 in the vehicle width direction is provided with a second fixing part 40, which is rigidly bonded to a nut member 39 on a bottom surface of the vehicle body by a tightening bolt 38, the bottom surface of the vehicle body being configured by the kick up part 6 of the front side frame 2. As shown in FIG. 3, the second fixing part 40 is provided on either side to form a pair on the outside of the pair of right and left first fixing parts 31 in the vehicle width direction.

An intermediate part of the projecting member 36 in the vehicle width direction, which is located between the base end part fixed to the lower surface of the rear sub cross member 11 by the fixing bolt 37 and the second fixing part 40, is provided with a lower arm supporting part 44 that swingably and elastically displaceably supports a lower arm 41 configuring the front suspension 4. The lower arm supporting part 44 is provided on either side to form a pair.

As shown in FIG. 11, a tip end part of the lower arm 41 is coupled to a wheel supporting member (axle housing) by a ball joint 42. A base end part of the lower arm 41 is configured by a so-called A-type arm that is supported swingably and elastically displaceably on each sub frame 3 by the pair of front and rear lower arm supporting parts 43, 44. As shown in FIGS. 4 and 10, the lower arm supporting parts 43, 44 are provided with a support shaft 45 for swingably supporting the lower arm 41 and rubber bushes 46 for allowing relative displacement (elastic displacement) of the lower arm 41 and the lower arm supporting parts 43, 44 by holding the support shaft 45.

Figure 2:
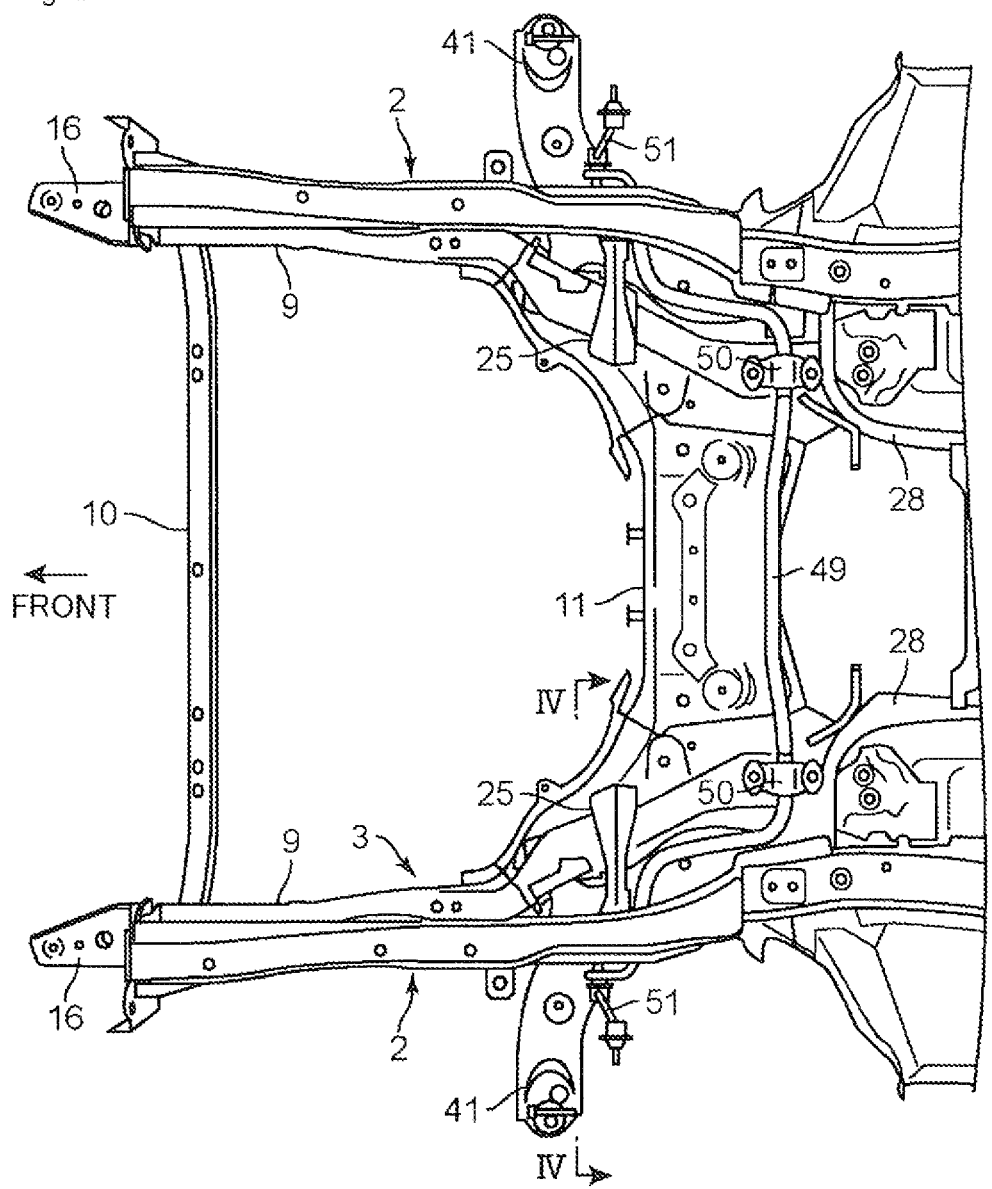
FIG. 2 is a plan view showing the embodiment of the suspension mounting structure.

As shown in FIG. 1, the front suspension 4 is provided with a pair of right and left shock absorbers 48 that are rigidly bonded to wheel supporting members 52 at lower end parts and supported elastically displaceably on a vehicle body side member by rubber insulators 47 at upper end parts, the vehicle side member being configured by strut towers (not shown). As shown in FIGS. 2 and 4, an upper surface of the rear sub cross member 11 has a stabilizer 49 supported rotatably by a supporting member 50, wherein both right and left end parts of the stabilizer 49 are provided with a pair of right and left coupling members 51 coupled to the shock absorbers 48.

The sub frames 3 having the configurations described above are carried to an assembly line of the vehicle, with the members configuring the front suspension 4 assembled together, and are assembled to a vehicle body frame at a lower side of the front side frames 2. When the vehicle runs, the shock absorbers 48 absorb thrust loads and the like that are input from the front wheels, not shown, to the wheel supporting members 52. Moreover, push-up force acting on the top end part of each lower arm 41 swings and displaces the lower arm 41 with respect to a supporting point of the support shaft 45 of the lower arm supporting parts 43, 44. In this manner, the control stability of the vehicle is maintained.

In addition, when the vehicle runs, road noise that is input to each lower arm 41 is absorbed by each of the rubber bushes 46 provided in the lower arm supporting parts 43, 44, preventing the road noise from being transmitted to the sub frames 3 and the front side frames 2 supporting the sub frames 3. Moreover, in case of a front-end collision where a front end part of the vehicle body collides with another vehicle or an obstacle, the resultant impact energy is absorbed by plastically deforming the upper and lower impact absorbing members 7, 16 into an accordion shape, and then the front side frames 2 and the sub frames 3 are compressed and deformed. Accordingly, the impact energy that is input to the front part of the vehicle body at the time of the front-end collision can be effectively prevented from being transmitted to the vehicle interior.

In the above-described suspension mounting structure for a vehicle, which has the pair of right and left front side frames 2 that extend from the dash panel 1 installed in the front surface part of the vehicle interior toward the front side of the vehicle, and the sub frames 3 provided below the front side frames 2, to support the front suspension 4 on the sub frames 3, the sub frames 3 are provided with the pair of right and left side sub frames 9 extending in the front-rear direction of the vehicle at the lower parts of the front side frames 2 and the rear sub cross member 11 that is provided in an extended manner in the vehicle width direction so as to couple the rear end parts of the right and left side sub frames 9 to each other. The rear part of each sub frame 3 has the lower arm supporting parts 43, 44 that swingably and elastically displaceably support the lower arm 41 of the front suspension 4, the first fixing part 31 that rigidly bonds the rear end part of the rear end part of the rear sub cross member 11 to the bottom surface of the vehicle body, and the second fixing part 40 that rigidly bonds each side end part of the rear sub cross member 11 to the bottom surface of the vehicle body at a position that is offset outward from the first fixing part 31 in the vehicle width direction. Therefore, this suspension mounting structure is advantageous in effectively ensuring the rigidity of supporting the front suspension 4 without increasing the weight of a vehicle body.

In other words, in the present embodiment, as shown in FIG. 7, each of the rear end parts of the rear sub cross member 11 is provided with the first fixing part 31 that is rigidly bonded to the lower surface of the vehicle body by the tightening bolt 29 and nut member 30, the lower surface of the vehicle body having the lower surfaces of the tunnel frames 28 disposed below the dash panel 1. Furthermore, as shown in FIG. 9, the projecting member 36, the tip end part of which projects outward in the vehicle width direction, is installed in the position that is offset from the first fixing part 31 in the vehicle width direction, and the tip end part of the projecting member 36 is provided with the second fixing part 40 that is rigidly bonded to the bottom surface of the vehicle body by the tightening bolt 38, the bottom surface of the vehicle body having the kick up part 6 of the front side frame 2. Therefore, thrust loads that are input from the lower arms 41 of the front suspension 4 to the rear parts of the sub frames 3 can be effectively supported by both the sub frames 3 and the front side frames 2.

Thus, unlike the conventional device in which a rubber bush is disposed in a supporting part that supports a side end part of a sub frame supporting a front suspension in order to absorb road noise that is input from a wheel to the front suspension when the vehicle runs, the suspension mounting structure of the present invention is advantageous in simplifying the structure of each sub frame 3 to attain a light vehicle body and adequately ensuring the rigidity of supporting the loads that are input from the tires to the front suspension 4 when the vehicle turns.

In addition, the lower arm supporting parts 43, 44 that are provided in the rear part of each sub frame 3 are configured to swingably and elastically displaceably support the lower arms 41 of the front suspension 4. Therefore, road noise that is input to the lower arms 41 can be absorbed by the lower arm supporting parts 43, 44 and effectively prevented from being transmitted to the sub frames 3 and the front side frames 2 supporting the sub frames 3. As a result, a sufficiently quiet vehicle interior can be ensured.

Especially, in the structure shown in FIG. 3, which is provided with the projecting member 36 that projects outward in the vehicle width direction from each side sub frame 9, the second fixing part 40 at the tip end part of the projecting member 36, and the lower arm supporting part 44 at the intermediate part of the projecting member 36 in the vehicle width direction, road noise that is input to the lower arms 41 is effectively prevented from being transmitted to the sub frames 3 and the front side frames 2.

In other words, as described above, since the rear end part of each sub frame 3 is rigidly bonded to the bottom surface of the vehicle body having the front side frames 2 and the like by means of the first fixing part 31 and the second fixing part 40, a strong frame member having the rear sub cross member 11 and the front side frames 2 of the sub frames 3 integrated together can be configured. Also, each of the lower arms 41 can be stably supported by the lower arm supporting part 44, which is disposed in the stably held projecting member 36 having both the right and left end parts thereof supported by this strong frame member. Therefore, as in a cantilever configuration in which the base end part of the lower arm is supported by the supporting part of the lower arm provided only in the sub frame, the road noise that is transmitted to the lower arm 41 can be efficiently absorbed by each of the rubber bushes 46 of the lower arm supporting part 44, without resonating the lower arm by the road noise that is input from the front wheels to the tip end part of the lower arm. Therefore, the suspension mounting structure of the present invention is advantageous in effectively preventing the transmission of the road noise to the front side frames 2.

In the embodiment described above, as shown in FIG. 7, the front-rear direction intermediate part of each of the side sub frames 9 is provided with the intermediate fixing part 25 that is rigidly bonded to the lower surface of each front side frame 2, and the vehicle side member having the front side frames 2 and the like is rigidly bonded to the rear parts of the sub frames 3 installed with the lower arms 41 at the intermediate fixing part 25, the first fixing part 31 and the second fixing part 40. Therefore, the suspension mounting structure of the present invention is advantageous in effectively reducing the weight of the vehicle body by thinning down the front side part 14 of each side sub frame 9 and effectively ensuring the rigidity of supporting the front suspension 4 by means of the sub frames 3.

In addition, as described in the embodiment above, the front end fixing parts 18 are provided in order to rigidly bond the front end parts of the side sub frames 9 to the front end parts of the front side frames 2, thereby coupling the side sub frames 9 to the front side frames 2 at, at least, three sections in the front and rear sides. In this case, the side sub frames 9 can be effectively reinforced by the front side frames 2, and the front side frames 2 can be effectively reinforced by the side sub frames 9. Therefore, the weight of the vehicle body can be effectively reduced by simplifying the structures of the side sub frames 9 and the front side frames 2 without degrading the strength of the vehicle body and the rigidity of supporting the front suspension 4.

In addition, in the embodiment described above, the front end parts of the side sub frames 9 are provided with the pair of right and left lower impact absorbing members 16 projecting toward the front side. Thus, when the front end part of the vehicle collides with a short obstacle, thus resultant impact energy is absorbed by compressing and deforming the lower impact absorbing members 16 and transmitted to both the side sub frames 9 and the front side frames 2 in order to stably support the front suspension 4. Therefore, the suspension mounting structure of the present invention is advantageous in preventing the side sub frames 9 from being deformed at the time of a collision that generates a relatively small impact energy, effectively reducing repair costs incurred after the collision.

Especially the front sub cross member 10 is installed in the front side parts of the sub frames 3 so as to extend in the vehicle width direction, and the front end parts of the right and left side sub frames 9 are coupled to each other by the front sub cross member 10 as described in the embodiment above. In this case, when one of the pair of right and left lower impact absorbing members 16 of the front end parts of the side sub frames 9 obliquely collides with an obstacle, an impact energy thus input to the lower impact absorbing member 16 can be transmitted from the front sub cross member 10 to the other side sub frame 9, thereby effectively supporting the side sub frames 9. Therefore, even when the front side parts 14 of the side sub frames 9 are thinned down in order to reduce the weight of the vehicle body, the impact load concentrically acts on one of the right and left side sub frames 9 at the time of the oblique collision, effectively preventing the side sub frame 9 from being significantly deformed.

Moreover, in the embodiment described above, the pair of right and left upper impact absorbing members 7 are provided in the front end parts of the front side frames 2 and the pair of right and left lower impact absorbing members 16 are provided in the front end parts of the side sub frames 9 located below the front side frames 2. Thus, even when the front end part of the vehicle collides with a tall obstacle or short obstacle, any of the upper impact absorbing members 7 and the lower impact absorbing members 16 can be compressed and deformed, thereby absorbing the impact energy. The suspension mounting structure of the present invention is advantageous in stably supporting the front-end suspension 4 by transmitting the impact energy, caused by the front-end collision, from the impact absorbing members 7, 16 to the side sub frames 9 and the front side frames 2 via the front end fixing parts 18, and, when a relatively small impact energy is produced by the collision, effectively reducing repair costs incurred after the collision by preventing the deformation of the side sub frames 9.

Summary of the Aforementioned Disclosures:

The invention of the present application is a suspension mounting structure for a vehicle, which has a pair of right and left front side frames (2, 2) that extend from a dash panel (1) installed in a front surface part of a vehicle interior toward a front side of the vehicle, and sub frames (3, 3) provided below the front side frames, to support a front suspension (4) on the sub frames (3), wherein the sub frames (3) have a pair of right and left side sub frames (9) that extend in a front-rear direction of the vehicle in lower parts of the front side frames (2), and a rear sub cross member (11) that is provided in an extended manner in a vehicle width direction so as to couple rear end parts of the right and left side frames (9) to each other, and rear parts of the sub frames (3) are provided with a pair of right and left lower arm supporting parts (43, 44) for swingably and elastically displaceably supporting lower arms (41) of the front suspension (4), a pair of right and left first fixing parts (31) that rigidly bond a rear end part of the rear sub cross member (11) to a bottom surface of a vehicle body, and a pair of right and left second fixing parts (40) that rigidly bond side end parts of the rear sub cross member (11) to the bottom surface of the vehicle body at positions that are offset outward from the first fixing parts (31) in the vehicle width direction.

In the present invention according to the configuration described above, the rear parts of the sub frames are provided with the pair of right and left lower arm supporting parts for swingably and elastically displaceably supporting the lower arms of the front suspension, the pair of right and left first fixing parts that rigidly bond the rear end part of the rear sub cross member to the bottom surface of the vehicle body, and the pair of right and left second fixing parts that rigidly bond the side end parts of the rear sub cross member to the bottom surface of the vehicle body at the positions that are offset outward from the first fixing parts in the vehicle width direction. Therefore, thrust loads that are input from the lower arms of the front suspension to the rear parts of the sub frames can be effectively supported by both the sub frames and the bottom surface of the vehicle body.

Thus, unlike a conventional device in which a rubber bush is disposed in a supporting part that supports a side end part of a sub frame supporting the front suspension in order to absorb road noise that is input from a wheel to the front suspension when the vehicle runs, the suspension mounting structure of the present invention is advantageous in simplifying the structure of each sub frame to attain a light vehicle body and adequately ensuring the rigidity of supporting the loads that are input from the tires to the front suspension when the vehicle turns. In addition, since the lower arm supporting parts provided in the rear parts of the sub frames swingably and elastically displaceably support the lower arms of the front suspension, road noise that is input to the lower arms can be absorbed by the lower arm supporting parts and effectively prevented from being transmitted to the sub frames and the front side frames supporting the sub frames. As a result, a sufficiently quiet vehicle interior can be ensured.

The suspension mounting structure of a preferred embodiment may have a projecting member that projects outward in a vehicle width direction of the side sub frames, from a position forward of each of the first fixing parts in the front-rear direction of the vehicle. Each of the second fixing part (40) may be provided at a tip end part of the projecting member (36). The lower arm supporting part (44) may be disposed in a vehicle width direction intermediate part of the projecting member (36).

According to this configuration, road noise that is input from the front wheels and transmitted to tip end parts of the lower arms can be absorbed efficiently by the rubber bushes provided in the lower arm supporting parts, without causing the lower arms to resonate by the road noise. Another advantage is that the road noise can be effectively prevented from being transmitted to the front side frames.

The suspension mounting structure of another preferred embodiment can have an intermediate fixing part (25) that rigidly bonds a front-rear direction intermediate part of each of the side sub frames (9) to a lower surface of each of the front side frames (2).

The characteristics described above are advantageous in effectively reducing the weight of the vehicle body by thinning down the front side parts of the side sub frames, and in effectively ensuring the rigidity of supporting the front suspension by means of the sub frames.

The suspension mounting structure of yet another preferred embodiment can have a front end fixing part (18) that rigidly bonds a front end part of each of the side sub frames (9) to a front end part of each of the front side frames (2).

The characteristics described above can provide a configuration in which the side sub frames are coupled to the front side frames at a plurality of front and rear sections. Therefore, the suspension mounting structure is advantageous in effectively reinforcing the side sub frames by means of the front side frames, effectively reinforcing the front side frames by means of the side sub frames, and simplifying the structures of the side sub frames and the front side frames to effectively reduce the weight of the vehicle body without degrading the strength of the vehicle body and the rigidity of supporting the front suspension.

In yet another preferred embodiment, a pair of right and left impact absorbing members (16) that project forward may be provided in front end parts of the side sub frames (9).

The characteristics described above can provide a configuration in which the impact absorbing members are compressed and deformed in order to absorb an impact energy generated when a front end part of the vehicle collides with a short obstacle, and the impact energy is transmitted to both the side sub frames and the front side frames so that the front suspension can be stably supported. Therefore, the suspension mounting structure is advantageous in preventing the side sub frames from being deformed when a relatively small impact energy is generated at the time of a collision, effectively reducing repair costs incurred after the collision.

In addition, the suspension mounting structure may be provided with a front sub cross member (10) that extends in the vehicle width direction to couple the front end parts of the right and left side sub frames (9) to each other.

According to this configuration, when only one of the pair of right and left impact absorbing members of the front end parts of the side sub frames obliquely collides with an obstacle, thus generated impact energy that is input to the impact absorbing member is transmitted from the front sub cross member to the other side sub frame so that the front suspension can be supported effectively. Therefore, even when the front side parts of the side sub frames are thinned down in order to reduce the weight of the vehicle body, an impact load acts on one of the right and left side sub frames at the time of the oblique collision, effectively preventing the side sub frames from being deformed significantly.

This application is based on Japanese Patent Application Serial No. 2010-149578 filed in Japan Patent Office on Jun. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A suspension mounting structure for a vehicle, which has a pair of right and left front side frames that extend from a dash panel installed in a front surface part of a vehicle interior toward a front side of the vehicle, and sub frames provided below the front side frames, to support a front suspension on the sub frames, wherein the sub frames have:
a pair of right and left side sub frames that extend in a front-rear direction of the vehicle in lower parts of the front side frames; and
a rear sub cross member that is provided in an extended manner in a vehicle width direction so as to couple rear end parts of the right and left side sub frames to each other, rear parts of the sub frames are provided with:
a pair of right and left lower arm supporting parts for swingably and elastically displaceably supporting lower arms of the front suspension;
a pair of right and left first fixing parts that rigidly bond a rear end part of the rear sub cross member to a bottom surface of a vehicle body;

a pair of right and left second fixing parts that rigidly bond side end parts of the rear sub cross member to the bottom surface of the front side frame at positions that are offset outward from the first fixing parts in the vehicle width direction, and a pair of right and left projecting members each of which projects outward in the vehicle width direction of the side sub frames, from a position forward of each of the first fixing parts in the front-rear direction of the vehicle to a position below the front side frame, wherein a tip end part of each of the projecting members is provided with corresponding one of the second fixing parts so that said tip end part of the projecting member is rigidly fixed to the bottom surface of the front side frame, a base end of each of said projecting members is fixed to said rear sub cross member, and each of the lower arm supporting parts is disposed in an intermediate part of corresponding one of the projecting members between said tip end part and said base end in a vehicle width direction.

2. The suspension mounting structure for a vehicle according to claim 1, further comprising an intermediate fixing part that rigidly bonds a front-rear direction intermediate part of each of the side sub frames to a lower surface of each of the front side frames.

3. The suspension mounting structure for a vehicle according to claim 1, further comprising a front end fixing part that rigidly bonds a front end part of each of the side sub frames to a front end part of each of the front side frames.

4. The suspension mounting structure for a vehicle according to claim 2, further comprising a front end fixing part that rigidly bonds a front end part of each of the side sub frames to a front end part of each of the front side frames.

5. The suspension mounting structure for a vehicle according to claim 1, wherein a pair of right and left impact absorbing members that project forward are provided in front end parts of the side sub frames.

6. The suspension mounting structure for a vehicle according to claim 2, wherein a pair of right and left impact absorbing members that project forward are provided in front end parts of the side sub frames.

7. The suspension mounting structure for a vehicle according to claim 3, wherein a pair of right and left impact absorbing members that project forward are provided in front end parts of the side sub frames.

8. The suspension mounting structure for a vehicle according to claim 4, wherein a pair of right and left impact absorbing members that project forward are provided in front end parts of the side sub frames.

9. The suspension mounting structure for a vehicle according to claim 5, wherein a front sub cross member for coupling the front end parts of the right and left side sub frames to each other is provided in an extended manner in the vehicle width direction.

10. The suspension mounting structure for a vehicle according to claim 6, wherein a front sub cross member for coupling the front end parts of the right and left side sub frames to each other is provided in an extended manner in the vehicle width direction.

11. The suspension mounting structure for a vehicle according to claim 7, wherein a front sub cross member for coupling the front end parts of the right and left side sub frames to each other is provided in an extended manner in the vehicle width direction.

12. The suspension mounting structure for a vehicle according to claim 8, wherein a front sub cross member for coupling the front end parts of the right and left side sub frames to each other is provided in an extended manner in the vehicle width direction.

* * * * *